(12) United States Patent
Peters et al.

(10) Patent No.: US 9,109,651 B2
(45) Date of Patent: Aug. 18, 2015

(54) BRAKE COMPONENT WITH AN ENCAPSULANT AND METHOD OF APPLYING THE ENCAPSULANT TO A BRAKE COMPONENT

(71) Applicant: Akebono Brake Corporation, Farmington Hills, MI (US)

(72) Inventors: Robert Allen Peters, Milford, MI (US); Orit Baron Milligan, Farmington Hills, MI (US); Kenneth Gutelius, Lake Orion, MI (US)

(73) Assignee: AKEBONO BRAKE CORPORATION, Farmington Hills, MI (US)

( * ) Notice: Subject to any disclaimer, the term of this patent is extended or adjusted under 35 U.S.C. 154(b) by 60 days.

(21) Appl. No.: 13/766,904

(22) Filed: Feb. 14, 2013

(65) Prior Publication Data
US 2013/0244039 A1 Sep. 19, 2013

Related U.S. Application Data (60) Provisional application No. 61/610,765, filed on Mar. 14, 2012.

(51) Int. Cl.
*B32B 5/16* (2006.01)
*F16D 65/00* (2006.01)
*F16D 49/14* (2006.01)
*F16D 51/08* (2006.01)
*F16D 65/097* (2006.01)

(52) U.S. Cl.
CPC ............ *F16D 65/0006* (2013.01); *F16D 49/14* (2013.01); *F16D 51/08* (2013.01); *F16D 65/0972* (2013.01); *Y10T 428/31504* (2015.04)

(58) Field of Classification Search
None
See application file for complete search history.

(56) References Cited

U.S. PATENT DOCUMENTS

| 3,415,758 | A | | 12/1968 | Powell et al. |
| 4,252,658 | A | | 2/1981 | Tasaka et al. |
| 5,089,154 | A | | 2/1992 | King |
| 5,112,541 | A | * | 5/1992 | Friend ........................ 264/4.7 |
| 5,438,806 | A | | 8/1995 | Reinhall |
| 5,762,166 | A | * | 6/1998 | Yano et al. ................ 188/73.37 |
| 6,213,257 | B1 | | 4/2001 | Yano et al. |
| 2004/0163903 | A1 | | 8/2004 | Saka |
| 2004/0188190 | A1 | | 9/2004 | Niwa et al. |
| 2004/0222055 | A1 | | 11/2004 | Niwa et al. |
| 2007/0045063 | A1 | | 3/2007 | Naito et al. |
| 2008/0060892 | A1 | | 3/2008 | Beylerian et al. |
| 2010/0140029 | A1 | | 6/2010 | Parild et al. |

FOREIGN PATENT DOCUMENTS

WO 2010/060191 A1 6/2010

* cited by examiner

*Primary Examiner* — Sheeba Ahmed
(74) *Attorney, Agent, or Firm* — The Dobrusin Law Firm P.C.

(57) ABSTRACT

A brake device comprising: a brake component including: a carrier and an encapsulant, wherein the carrier and encapsulant are disposed on and/or within one or more brake components, and the carrier assists in adhering the encapsulant to the brake component and wherein the encapsulant includes one of more lubricants and/or one or more adhesives, or both and the encapsulant, the carrier, or both are dry to the touch after the encapsulant is attached to the brake component and prior to an initial brake apply.

20 Claims, 8 Drawing Sheets

BRAKE COMPONENT WITH AN ENCAPSULANT AND METHOD OF APPLYING THE ENCAPSULANT TO A BRAKE COMPONENT

FIELD

The present teachings relate to a device and method for reducing noise, vibration, and harshness so a brake system. The present teachings generally relate to a brake component that includes a microencapsulant and a method of applying the microencapsulant to the brake component.

BACKGROUND

The present teachings are predicated upon providing an improved brake system (e.g., disc brake, drum brake, or both) for use with vehicles. For example, the brake system may be used with almost any vehicle (e.g., car, truck, bus, train, airplane, or the like). Alternatively, the brake system may be integrated into assemblies used for manufacturing or other equipment that require a brake such as a lathe, winder for paper products or cloth, amusement park rides, wind turbines, or the like. However, the present teachings are most suitable for use with a passenger vehicle (i.e., a car, truck, sports utility vehicle, or the like).

Generally, a disc brake system includes a rotor, a caliper body, a support bracket, an inboard brake pad, and an outboard brake pad that are on opposing sides of the rotor. The caliper body further includes a bridge, one or more fingers, and a piston bore. The piston bore houses a piston. The bore has a bore axis that the piston moves along during a brake apply and a brake retract. The piston bore may include a fluid inlet, a closed wall, a front opening including a piston boot, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and info contact with a brake pad. The caliper housing will then move on and/or along one or more pins so that the one or more fingers contact the opposing brake pad. The contact between the piston and a brake pad and/or the one or more fingers and a brake pad may cause noise, vibrations, or harshness.

Drum brake systems generally include a pair of brake shoes attached to a support plats (i.e., a backing plate). The brake shoes are connected together via at least one spring that assists in retracting the brake shoes after a brake apply. The drum brakes further include a wheel cylinder between the brake shoes that moves the brake shoes during a brake apply. During a brake apply the master cylinder moves the brake shoes into contact with a drum so that a friction force is created. The brake shoes may contact a portion of the support (backing) plate during a brake apply, a brake refract, or both creating noise.

One attempt to reduce the noise in both the disc brake system and the drum brake system employs a loose grease and/or lubricant that may be applied on the pressure plate of the brake pad in an attempt to reduce brake noise. However, excess lubricant may be applied to the braking system and the excess lubricant may: coat the friction material, transfer to other components of the brake system and/or manufacturing equipment, form a collection point for dirt and other contaminants, or a combination thereof. Some systems may attach a shim or some other device to the brake pads, the piston, a finger, or a combination. In an attempt to reduce brake noise, vibrations, or harshness.

The disc brake systems and drum brake systems discussed above may further rattle during use in addition to brake squeal. Rattling may be caused by the contact between brake parts such as a brake pad striking a caliper body or a support bracket, or drum brake part such as a brake shoe contacting a drum or a support plate during acceleration events such as driving over bumps. Other events that may cause rattle are disc thickness variation of the rotor, loose brake pads and/or brake shoes, brake torque variation, or a combination thereof so that during stopping and/or running the brake components vibrate causing a rattling sound. Some attempts have been made to reduce rattle by adhering one or more brake components together so that when the components are installed the parts are properly placed in their intended position. However, the addition of an adhesive in the manufacturing process presents difficulty in handling, correctly aligning the parts before contacting the parts together so that adhesive is not incorrectly placed on the parts, prematurely adhering components together, avoiding contamination such as dirt and dust, removal and disposal of a protective backing sheet, issues with application of an adhesive, or a combination thereof. What is needed is an apparatus and method for applying an adhesive to a brake component so that the adhesive is applied to a target area without contaminating the adhesive, transferring the adhesive to adjacent components, creating handling difficulties, or a combination thereof.

Examples of attempts to place a grease and/or lubricant in a brake system may be found in U.S. Pat. Nos. 5,438,806; 5,762,186; and 6,213,257; and U.S. Patent Application publication Nos. 2004/0163903; 2007/0045083; 2008/0080892; and 2010/0140020; and WO2010/060191; examples of attempts to place an adhesive in a brake system may be found in U.S. Patent Application Publication No. 2004/022055 and 2004/0188190; some examples of lubricants may be found in U.S. Pat. Nos. 4,252,658 and 5,089,154; and an example of a capsule may be found in U.S. Pat. No. 3,415,758 all of which are incorporated by reference herein for all purposes. However, these systems may include excess grease, lubricants, adhesive, or a combination thereof on the brake components so that the grease, lubricants, adhesive, or a combination thereof becomes located on a friction surface. The excess grease, lubricant, adhesive, or a combination thereof may transfer from the brake component to other components of the brake system, manufacturing systems, or a combination thereof. During a change of the brake pads and/or brake shoes grease and/or an adhesive may be applied manually to a brake component; however, the person changing the brake pads may not apply the grease and/or adhesive, forget to apply the grease and/or adhesive, apply the grease and/or adhesive to an incorrect region, or a combination thereof to the component and the brake system may suffer from noise, vibration, or harshness.

It would be attractive to have a device, method, or both that allows for a grease, a a lubricant, an adhesive, or a combination thereof to be applied to the brake component so that the grease, lubricant, adhesive, or a combination thereof are dry to the touch until a first brake apply. It would be attractive to have a device, method, or both where during a brake change, personnel is not required to apply lubricant to a brake component. What is needed is a device, method, or both where the brake component is free of excess grease, excess lubricant, excess adhesive, the like, or a combination thereof so that grease, lubricant, adhesive or a combination thereof are not susceptible to secondary transfer onto manufacturing equipment, installation equipment, braking system equipment, friction surfaces, or a combination thereof. What is further needed is a device, method, or both where grease, lubricant, adhesive, the like, or a combination thereof are applied only to regions of the brake system where grease, lubricant, adhesive, the like, or a combination thereof are required so that noise in the system is reduced and/or eliminated without the system including excess grease, lubricant, adhesive, or a combination thereof.

SUMMARY

The present teachings meet one or more of these needs by providing: a brake device comprising: a brake component including: (i) a carrier and (ii) an encapsulant, wherein the carrier and encapsulant are disposed on and/or within one or more brake components, and the carrier assists in adhering the encapsulant to the brake component and wherein the encapsulant includes one or more lubricants and/or one or more adhesive, or both and the encapsulant, the carrier, or both are dry to the touch after the encapsulant is attached to the brake component and prior to an initial brake apply.

The present teachings provide A shim composition comprising; (1) a base layer; (2) optionally one or more flexible layers; (3) one or more encapsulant layers including: (i) a carrier and (ii) an encapsulant; wherein the encapsulant includes one or more lubricants and/or one or more adhesives, and the encapsulant, the carrier, or both are dry to the touch after the encapsulant is attached to the shim and prior to an initial brake apply.

The present teachings provide: a method comprising the steps of: (a) applying a carrier to a brake component: (b) applying an encapsulant to the brake component; (c) curing the carrier, the encapsulant, or the mixture thereof and the brake component so that the carrier, the encapsulant, or both are dry to the touch; and wherein the encapsulant includes one or more lubricants, one or more adhesives, or both.

The present teachings provide: a device comprising: a brake component including: a carrier and an encapsulant (e.g., a microencapsulated lubricant, a microencapsulated grease, a microencapsulated adhesive, or a combination thereof). Wherein the carrier and encapsulant are disposed on and/or within the brake component and the carrier assists in adhering the encapsulant to the brake component.

One possible embodiment includes: a shim composition comprising: a base layer (e.g., steel, plastic, paper); optionally one or more flexible layers (e.g., rubber, plastic, paper); one or more encapsulant layers including: a carrier and an encapsulant; wherein the encapsulant includes a lubricant and/or an adhesive, and the encapsulant is dry to the touch during production of the shim and poor to an initial brake apply.

Another possible embodiment of the present teachings include: a brake system comprising: a device comprising: a brake component, the brake component including: a carrier and an encapsulant (i.e., a microencapsulated lubricant a microencapsulated grease, a microencapsulated adhesive, or a combination thereof), wherein the carrier is disposed on the brake component and the carrier assists in adhering the lubricant to the brake component.

Yet another possible embodiment of the present teachings includes: a kit including a device comprising: a brake component, the brake component including: a carrier and an encapsulant (i.e., an encapsulated lubricant, preferably a microencapsulated lubricant, and most preferably a microencapsulated grease), wherein the carrier is disposed on the brake component and the carrier assists in adhering the lubricant to the brake component, wherein the kit is free of a tube of grease and/or lubricant.

One possible method of the present teachings include; the steps of: obtaining a brake component; obtaining a carrier (i.e., an adhesive, a paint, a bonding agent, a resin, a phenolic resin, or mixtures thereof); obtaining an encapsulant (i.e., a microencapsulated lubricant, a microencapsulated grease, a microencapsulated adhesive, or a combination thereof); applying the carrier, the encapsulant, or a mixture thereof on the brake component: and curing the carrier and the carrier, the encapsulant, or the mixture thereof.

The teachings herein surprisingly solve one or more of these problems by providing a brake component with an encapsulated grease, lubricant, adhesive, the like, or a combination thereof of the teachings herein that is dry to the touch. The microencapsulated grease, lubricant, adhesive, the like, or a combination thereof of the teachings herein allows for a brake pad that is free of excess grease, lubricant, adhesive, or a combination thereof so that the grease, lubricant, adhesive, or a combination thereof may not transfer to other parts, devices, machinery, installation equipment, or a combination thereof during production, transportation, installation, or a combination thereof. The teachings herein further allow for precise deployment of microencapsulated grease, lubricant, adhesive, or a combination thereof so that non-contact areas (i.e., areas other than contact points between the brake pad and brake system such as the caliper fingers, the piston, brake shoes, support (backing) plate, pins, or a combination thereof) are free of grease, lubricant, adhesive, or a combination thereof. The teachings further provide for a microencapsulated grease, lubricant, adhesive, or a combination thereof that is added to the brake components during the manufacturing process so that during an initial installation of the brake component and/or during changing of the brake pads, brake shoes, or both separate grease, lubricant, adhesive, or a combination thereof does not need to be added to new brake pads, brake shoes, brake components, or a combination thereof to prevent noise, vibration, or harshness. The teachings herein surprisingly solve one or more of these problems by providing a method of applying the grease, lubricant, adhesive, or a combination thereof to each brake component so that the grease, lubricant, adhesive, or a combination thereof are precisely deployed in a contact region of the brake component, are dry to the touch, reduce noise, vibration, harshness, or a combination thereof, are free of excess grease, are free of excess lubricant, are free of excess adhesive, or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference info this written description.

The teachings herein include a brake system. The brake system may be any type of brake system that may be used to create friction. Preferably, the brake system may be a dry brake system (i.e., fluid is not passed over the friction material during use). The brake system may be free of fluid passed over or surrounding the friction material during use. The brake system may be a drum brake, a disc-brake, or both. A brake pad, a brake shoe, or both may include a pressure plate, a brake lining, or both. The brake system may be a drum brake system and include a support (backing) plate, a drum, a brake shoe, or a combination thereof. The support (backing) plate may include lands, platforms, shoulders, or a combination thereof, hereinafter referred to as lands. The lands may come into contact with other components of the brake system. For example, the brake shoes may contact the lands during a brake apply, a brake retract, or a position therebetween forming a contact region.

The brake system may be a disc brake system and include a caliper, a support bracket, and a rotor. The caliper may include a piston bore with a piston, one or more fingers, and a bridge connecting the piston bore to the one or more fingers. The support bracket may include brake pads, pins, or both (e.g., slide pins for the caliper, the brake pads, or both slide upon). However, the brake pads may slide directly on the support bracket. In another example, the brake pads may slide indirectly on a support bracket (i.e., a pad clip may be located between the support bracket and the respective brake pad). The support bracket may include an abutment area. The abutment area may be located adjacent to and may contact an ear of a brake pad, a pad clip, or both. The abutment area, the pad clip, the ear of the brake pad, or a combination thereof may include the encapsulant. During a brake apply the piston may be moved into contact with a brake pad and then the brake pad may be moved into contact with the rotor. The caliper may slide so that the one or more fingers move the opposing brake pad into contact with the rotor so that a friction force is created. The piston, the one or more fingers, or both may contact the brake pads in a contact region. The piston, the one or more fingers, or both may contact a shim, in a contact region, that is located, between the brake pad and the piston and/or the one or more fingers. The piston, the one or more fingers, or both may contact a brake pad in a contact region.

The teachings herein contemplate adding a lubricant, grease, an adhesive, or a combination thereof to a brake component. Preferably a lubricant, a grease, an adhesive, or a combination thereof once applied to a brake component is dry to the touch. More preferably, a microencapsulated lubricant, a microencapsulated grease, a microencapsulated adhesive, or a combination thereof (hereinafter "encapsulant") is added to a brake component so that the lubricant and/or grease once released prevents friction, noise, vibration, harshness, or a combination thereof and/or the microencapsulated adhesive adheres one or more components together and prevents movement of two adjacent parts relative to each other so that noise, vibration, harshness, or a combination thereof are minimized and/or substantially eliminated during running, during a brake apply, or a condition therebetween.

The brake component may be any component of a brake assembly that is in contact with another component of a brake assembly. The brake component may be any component that may create friction, noise, vibration, harshness, or a combination thereof during running, a brake apply, a brake release, or a time therebetween when the brake component is free of or substantially free of a grease or a lubricant. The brake component may be any brake component that when lubricated experiences a reduction in friction, noise, vibration, harshness, or a combination thereof. The component may be a piston, the one or more fingers of a caliper, brake shoe, support (hacking) plate, pins (e.g., pins that the caliper moves on, that the brake pads move on, or both), a pressure plate, a shim, a secondary material, lands, platforms, shoulders, or a combination thereof. Preferably, the brake component may be a shim, a brake pad, or both.

The shim may be any material that is placed between a brake pad and a piston, an actuator, a finger, or a combination thereof. The shim may have an encapsulant on one or both sides. For example, the shim may have encapsulant on a side that contacts a brake pad and the shim may have an encapsulant on a side that contacts a piston, an actuator, a finger, or a combination thereof. The sides of the shim may be partly covered, entirely covered, or both. The shim may be made of any material that reduces the distance between a piston, one or more fingers, or both and a brake pad. The shim may be paper thin. For example, the shim may have a thickness of about 1 mm or less, about 0.5 mm or less, or even about 0.1 mm or less while reducing the distance between one or more brake components. The shim may be one layer. The shim may be one layer that includes encapsulant. For example, the shim may be rubber, plastic, or the like that Includes the encapsulant within the rubber, plastic, or the like so that when the shim is contacted the contents of the encapsulant is released. The thickness of the shim may be the same thickness as the encapsulant. The shim may include a base material.

The base material may be a metal, plastic, polymeric material, a natural material, a synthetic material, or a combination thereof. The shim may be made of a combination of different materials. For example, the shim may have layers of metal, rubber, and the encapsulant. The shim may be made of a composite material such as plastic. Preferably, at least a portion of the shim is made of metal. The shim may be made entirely or partially of steel. The shim may include a flexible medium. The shim may be made partially or entirely of a flexible medium. The flexible medium may be a polymeric material, a natural material, a synthetic material, a rubber (e.g., butadiene rubber, ethylene acrylic, ethylene propylene rubber (EPM or EPDM), nitrile butadiene rubber (NBR), silicone rubber, or a combination thereof), a low friction material, or a combination thereof. The shim may include a porous layer so that the contents of the encapsulant when ruptured may pass out of the shim through the pores. The shim may include an encapsulant layer.

The encapsulant layer may be a discrete layer on or within one or more of the other layers. For example, the encapsulant layer may be disposed on the surface of the base material, the flexible material, or both. In another example, the encapsulant may be disposed within the base material, the flexible medium, or both. The encapsulant layer may be one or more discrete encapsulated pieces and preferably a plurality of discrete encapsulated pieces that together form a layer. An encapsulant layer may include 100 or more, 250 or more 500 or more, or even 1000 or more discrete encapsulated pieces. The shim may include a base material, a flexible medium, encapsulant, or a combination thereof in any order, combination, or mixture. The encapsulant may be incorporated into the shim during the manufacturing process. For example, the encapsulant may be added to a liquid rubber so that a rubber/encapsulant mixture is solidified and formed into a shim. The brake system may be free of a shim between a piston, an actuator, a finger, or a combination thereof and a brake pad.

The brake pad may be any style of brake pad that produces a friction force. The brake pad may be any size and configuration so that the brake pad fits within the braking system and may be used to create a friction force. Preferably, the brake pad may include a pressure plate and friction material. The encapsulant may be located on the pressure plate. The encapsulant may be located on any location of the pressure plate.

The encapsulant may be located on and/or within the pressure plate, one or more pins, a shim, a secondary material, one or more pistons, one or more fingers, a brake shoe, a backing plate, or a combination thereof in any size and/or shape so that the encapsulant breaks during a brake apply and lubricates a contact region and/or adheres two or more components together in a contact region. Preferably, the encapsulant is located on and/or within the pressure plate, shim, a secondary material, or a combination thereof in such a configuration that the pressure plate, shim, pins, secondary material, or a combination thereof are free of excess encapsulant. The encapsulant may be located on and/or within the brake component so that when the encapsulant is compressed the encapsulant's contents are released and the brake component is free of excess grease, lubricant, adhesive, the like, or a combination thereof. In one example, the encapsulant may be incorporated into the component and the lubricant may exit the component through pores, holes, or both so that the contents of the encapsulant coat a surface in which it contacts. The encapsulant may be an integral part of a brake component, the pressure plate, shim, a secondary material, or a combination thereof. For example, the encapsulant may be bonded with the material of the brake component, pressure plate, shim, secondary material, or a combination thereof so that the encapsulant is an integral part of the respective component. The configuration of the encapsulant on and/or within the pressure plate, shim, secondary material, or a combination thereof may vary from application to application and from brake system to brake system. For example, an inboard brake pad and/or inboard shim may have a different application configuration than an outboard brake pad and/or outboard shim.

The encapsulant layer may be formed so that it is any shape. The encapsulant layer may be formed so that it matches the shape of a component, substantially mirrors the shape of all or a portion of a component, mirror the shape of a contact region between two or more components, or a combination thereof, for example, the shape of the encapsulant layer may form a circle, a square, a "U" shape, a line, an oval, a sinusoidal curve, a wave, an irregular curve (i.e., a curved line that is not symmetric), toroidally shaped, a crescent shape, a half circle, a three quarter circle, a "W" shape, a "M" shape, geometric, non-geometric, or a combination thereof. The entire pressure plate, shim, secondary material, or a combination thereof may be covered with encapsulant. Portions of the pressure plate, shim, secondary material, or a combination thereof may be free of encapsulant. Preferably, the non-contact portions of the pressure plate, shim, pins, secondary material, or a combination thereof may be free of encapsulant. The encapsulant may be dry to the touch. Preferably, the encapsulant may be dry to the touch when the brake component is in a package, installed in the brake system and before a pressure apply, in a manufacturing line, or a combination thereof. More preferably, the encapsulant is dry to the touch after the encapsulant has been cured and before an initial brake apply. The encapsulant may be resistant to breaking and/or melting due to heat. The encapsulant may withstand a temperature of about 50° C. or more, about 75° C. or more, about 100° C. or more, about 125° C. or more, or even about 150° C. or more. The encapsulant may withstand a temperature of about 500° C. or less, about 250° C. or less, or about 200° C. or less. Preferably, the encapsulant may withstand any temperature of a standard paint curing oven. The encapsulant may be adhered, bonded, held on, or a combination thereof to the brake component by any apparatus that is useful in adhering, bonding, attaching, or a combination thereof an encapsulant to a brake component.

The encapsulant may be attached on and/or within the brake component by a carrier. The earner may be any material that assists in attaching an encapsulant to and/or within a brake component. The carrier may be a dry paint, a liquid paint, an ink, an adhesive, a bonding agent, a phenolic adhesive, silicone adhesive, acrylic pressure sensitive adhesive (PSA), glue, tape, a resin, a phenolic paint, a UV cure adhesive, a temperature cure adhesive, a moisture cure adhesive, any component with phenolic particles that is useful for securing the encapsulant on a component, or mixtures thereof. The carrier when cured may have a sufficiently high glass transition temperature (Tg) so that the carrier maintains a bond at temperature of about 50 C or more about 100° C. or more, about 125° C. or more, or about 150° C. or more, but about 400° C. or less or about 350° C. or less. The carrier when cured may form irreversible chemical bonds. The carrier may be any material that has a sufficient amount of cross-linking so that the carrier forms a permanent bond with a component, an encapsulant, or both. The carrier may have a sufficiently high decomposition temperature so that the carrier withstand typical temperatures during a braking experience discussed herein (i.e., about 100° C. or more, about 125° C. or more, or about 150° C. or more, but about 400° C. or less or about 350° C. or less). The carrier may be any material that may be used to bond to dissimilar materials together. For example, the carrier may be used to bond the encapsulant to a brake pad. The carrier may include a sufficient amount of cross linking agent or hardening agent to increase the glass transition temperature to a desired glass transition temperature. The carrier may include about 5 percent by weight or more, about 10 percent by weight or more, or about 15 percent by weight or more a cross linking agent, a hardener, or both. Preferably, the carrier may be a thermoset. Examples of a thermoset that may be used are an epoxy, an acrylic, a polyester resin, a polyurethane resin, a polyol, acrylic polymer, or a combination thereof. The encapsulant may be mixed into the carrier before the carrier is applied to the brake component. The encapsulant may be added to the brake component and then the carrier may be added over the encapsulant. The encapsulant may be added to the carrier after the carrier is applied to the brake component. The carrier and encapsulant may be added to a brake component simultaneously. The carrier may be partially cured and then the encapsulant may be added to the brake component and carrier. The carrier may be fully cured and then the encapsulant may be added to the brake component while the carrier is still hot. The encapsulant may be added to the carrier while the carrier is hot and/or cooled.

The encapsulant may be integrated into a brake component. During the manufacture of a brake component the encapsulant may be added into the material of the component so that the encapsulant does not need to be added during a separate step. For example, a shim may include a rubber outer layer, and the encapsulant may be added in the rubber outer layer so that when the rubber outer layer is applied to the shim the encapsulant is simultaneously added to the shim.

The encapsulant may be made of any material that holds, contains, surrounds, encapsulates, or a combination thereof a component such as a grease, lubricant, adhesive, the like, or a combination thereof (hereinafter "contents") that when applied to a brake component provides some lubrication and/or adhesion so that friction, noise, vibration, harshness, or a combination thereof are substantially reduced and/or eliminated. The encapsulant may be made of any material that holds a grease, lubricant, adhesion, the like, or a combination thereof so that the contents are dry to the touch when located in the encapsulant. The encapsulant may be made of any material that may be adhered, bonded, attached to, or a combination thereof to a brake component. The encapsulant's composition may include a phenolic. The encapsulant's composition may have lubricative properties, adhesive properties, or both. The encapsulant's composition when broken may have lubricative properties, adhesive properties, or both. The encapsulant once broken may degrade and provide lubricative properties. The encapsulant once broken may degrade and provide adhesive properties. For example, the material of the encapsulant and the contents of the encapsulant may act as a two part adhesive when broken, when mixed with the contents of an adjacent encapsulant, when mixed with air, or a combination thereof.

The encapsulant's composition may include a phenolic, cellulose, ethyl cellulose, cellulose nitrate, cellulose acetate phthalate, polymethyl methacrylate, acrylonitrile styrene copolymer, polystyrene, vinylidene coloride-acnylonitrile copolymer, epoxy resin, polyvinyl-formal, toluene-ethanol solvent, polybutadiene, or a combination thereof. Additional teachings regarding the composition of and method of making the encapsulant may be gleaned from the teachings herein including those of Column 1; line 31 through Column 10; line 33 of U.S. Pat. No. 3,415,758. The encapsulant may include a magnetic material in its composition. The encapsulant may include iron, nickel, cobalt, a magnetic stainless steel, graphite, or a combination thereof in the composition of the encapsulant. The encapsulant may include a magnetic material that does not rust in the composition of the encapsulant. The encapsulant may be any size and shape so that the encapsulant may fee adhered to the pressure plate of the brake pad and held in place. The encapsulant may be pliable so that the shape of the encapsulant during application of the encapsulant on the component may change and increase the amount of surface area contacting the component so that the encapsulant Is securely adhered to the pressure plate.

The encapsulant may have a largest dimension of about 3 mm or less, about 6 mm or less, about 5 mm or less, about 3 mm or less, or about 2 mm or less. The encapsulant may have a largest dimension of about 0.001 mm or more, about 0.005 mm or more, about 0.01 mm or more, about 0.05 mm or more, preferably about 0.5 mm or more, more preferably about 1.0 mm or more, or even more preferably about 1.5 mm or more. The encapsulant may have a largest dimension of between about 0.005 mm and about 10 mm; preferably between about 0.1 mm and about 8 mm; or more preferably between about 5 mm and 0.5 mm. The largest dimension may be a length, a width, a diameter, or a combination thereof. Preferably, the largest dimension is a cross-sectional length (e.g., a diameter) of the encapsulant. The encapsulant may include an internal volume. The internal volume may be any volume so that the encapsulant holds a sufficient amount of grease and/or lubricant to lubricate a brake component. The internal volume of the encapsulant may be sufficiently large so that the encapsulant holds enough lubricant that the lubricant assists in reducing and/or eliminating noise, vibration, and harshness in a braking system, enough adhesive so that the adhesive assists in fixedly connecting the shim to a brake component so that the adhesive assists in reducing and/or eliminating noise, vibration, and harshness in the braking system, or a combination of both. The internal volume may be any volume so that the encapsulant holds a sufficient amount of adhesive to adhere two or more brake components together. The internal volume may be any volume that holds lubricant, grease, adhesive, or a combination thereof so that when the encapsulant is ruptured the contents, are released and provide lubrication and/or adhesion.

The encapsulant may have an internal volume that holds about 3 ml or less, about 2 ml or less, about 1 ml or less, about 0.5 ml or less, or about 0.1 ml or less material. The encapsulant may have an internal volume that holds about 0.001 ml or more, about 0.01 or more, or about 0.05 mm or more material. The encapsulant may have an internal volume of between about 3 ml and about 0.1 ml or between about 1.5 ml and about 0.5 ml. The encapsulant may have one internal volume. The encapsulant may have more than one internal volume. The contents of the encapsulant may be segregated in the internal volume of the encapsulant (i.e., the encapsulant may include a divider). The encapsulant may include 1, 2, 3, 4, or even 5 internal dividing walls forming 2, 3, 4, 5, or even 6 pockets in the encapsulant. The contents of the encapsulant may vary from encapsulant to encapsulant. The contents of one encapsulant or from one pocket of an encapsulant when mixed with the contents of another encapsulant or another pocket of an encapsulant may provide lubricative properties, adhesive properties, or both. The contents of one encapsulant or one pocket of an encapsulant when mixed with the contents of another encapsulant or the contents of another pocket of an encapsulant may breakdown the encapsulant so that the encapsulant assists in lubricating, adhering, or both. The encapsulant may be resistant to breaking due to low impact forces (i.e., a force less than a typical break apply).

The encapsulant may be any material that exhibits some burst resistance. The encapsulant may be burst resistant to a force of about 2 MPa or less, about 1 MPa or less, or about 0.5 MPa or less. The encapsulant may be burst resistant to a force of about 0.1 MPa or more, about 0.2 MPa or more, or about 0.3 MPa or more. The encapsulant, preferably, bursts during a "normal" brake apply (i.e., a brake apply during normal stopping and not an emergency stop). The encapsulant may burst during a brake apply that exhibits a pressure of about 2 MPa or more, about 3 MPa or more, or about 4 MPa or more. The encapsulant may break during a brake apply of about 10

MPa or less, about 7 MPa or less, or about 5 MPa or less. Preferably, the encapsulant exhibits enough break resistance that the encapsulant does not break during the manufacturing process, during transportation of the brake component, during transportation of a completed brake assembly, during application of the encapsulant unto the brake component, or a combination thereof. The encapsulant upon breaking may release its contents. The burst strength of the encapsulant may vary based upon the wall thickness of the encapsulant. For example, an encapsulant with a wall thickness of 0.0005 mm may exhibit a burst strength of about 0.5 MPa and ah encapsulant with a wall thickness of about 0.001 mm may exhibit a burst strength of about 1.5 MPa. The wall thickness may be any wall thickness so that the encapsulant has a sufficient strength to resist bursting prior to a first brake apply, but thin enough so that the encapsulant has an adequate volume so that the encapsulant includes enough contents to reduce friction, noise, vibration, harshness, adhere two or more pads together, or a combination thereof. The encapsulant may have a wall thickness of between about 0.001 mm or more, about 0.005 or more, about 0.01 mm or more, about 0.05 mm or more. The encapsulant may have a wall thickness of about 3 mm or less, about 2 mm or less, or about 1 mm or less. The encapsulant may have a wall thickness of between about 1 mm and about 0.00001 mm, preferably between about 0.75 mm and about 0.0001 mm, or more preferably between about 0.5 mm and about 0.001 mm.

The contents of the encapsulant may be any material that assists in reducing friction, noise, vibration, harshness, adhering two or more brake components together, or a combination thereof. The contents of the encapsulant may be any material that once released from the encapsulant creates a low friction coating on the respective brake component. The contents of the encapsulant may be any material that may hold two or more brake components together, bond two or more brake components together, limit movement between two or more brake components, or a combination thereof. The contents of the encapsulant may be grease, a lubricant, a petroleum based lubricant, a synthetic lubricant, a natural lubricant, graphite, silicone, polyolefin, wax, a semi-solid, a liquid, a dry lubricant, oil, natural oil, synthetic oil, a corrosion resistant lubricant, a sulfur free lubricant, glue, a one part adhesive, a multi-part adhesive, a liquid adhesive, a gel adhesive, a pressure sensitive adhesive, a moisture cure adhesive, a heat cure adhesive, a light cure adhesive, or a combination thereof. The use of the term grease and lubricant may be used interchangeably herein.

The adhesive when cured may have a sufficiently high glass transition temperature (Tg) so that the adhesive maintains a bond at a use temperature. The adhesive may be any material that may be used to bond to dissimilar materials together. For example, the adhesive may be used to bond a component to a brake pad. The adhesive may include a sufficient amount of cross linking agent or hardening agent to increase the glass transition temperature to a desired glass transition temperature. The adhesive may cure at room temperature. The adhesive may cure at elevated temperatures. The adhesive may form at fixed connection at a running temperature, a use temperature, or both. The adhesive may form a fixed connection at a running temperature (i.e., a temperature when the brakes are not being applied and the car is moving) and release during a braking temperature forming a lubrication layer between two adjacent components. The adhesive may include about 5 percent by weight or more, about 10 percent by weight or more, or about 15 percent by weight or more a cross linking agent, a hardener, or both. Preferably, the adhesive may be a thermoset. Examples of a thermoset that may be used are an epoxy, an acrylic, a polyester resin, a polyurethane resin, a polyol, acrylic polymer, or a combination thereof. The adhesive may include a natural adhesive, a synthetic adhesive, an acrylic, silicone, a cyanoacrylate, olefinic polymers, vinyl polymers, thermoplastic rubber-containing polymers, epoxies, urethanes a polyurethane, polyolefin materials, copolymers and terpolymers with at least one monomer type an alpha-olefin, phenol/formaldehyde materials, acrylic materials, phenolic materials, urethane materials, phenoxy materials, and polyurethane materials with high glass transition temperatures, or a combination thereof. An epoxy based adhesive may include an ethylene copolymer or terpolymer that may possess an alpha-olefin. The contents of the encapsulant preferably may not flow (i.e., they will have a high enough viscosity so that they remain located substantially in place once the encapsulant is ruptured). The encapsulant may include magnetic particles. The magnetic particles may assist in maintaining the encapsulant, the lubricant, the adhesive, or a combination thereof in place on the brake component. The magnetic particles may be any magnetic material. The magnetic particles may be iron, nickel, cobalt, magnetic steel, or a combination thereof. The magnetic particles, may be a coated steel. The magnetic particles may be any particle that is magnetic and resistant to rust. The magnetic particles may be Martensitic stainless steel.

The brake component may be included in a brake system. The brake component may be part of a kit. The kit may include one component. The kit may include an inboard brake component, an outboard component, or both. The kit may include brake pads, brake pad shims, pins, brake shoes, a drum, a support (backing) plate, secondary materials, a caliper, or a combination thereof. The kit may include a secondary material that includes the encapsulant. The kit may include only brake pads. The kit may include only shims. The kit may include brake pads with a shim temporarily and/or permanently attached. Preferably, the kit is free of a tube of grease and/or lubricant. The brake component may be included in a brake system.

The brake component may be included in a support bracket, a caliper, or a location between the two. For example, the brake component may attach to pins that span between the caliper and the support bracket. The brake system may be a dry brake system. For example, the brake system may be free of additional lubricant that is circulated over all or a portion of the brake system. In another example, the brake system is free of a carrier that submerges all or a portion of the brake system in a lubricant.

The encapsulant may foe disposed on and/or within a brake component using any method. The method may be any method that allows for an encapsulant to be disposed on and/or within the brake component so that after the encapsulant is disposed on and/or within the brake component, the encapsulant is dry to the touch, free of tackiness, or both. The method may be any method that allows for an encapsulant to be disposed on and/or within the brake component so that after the encapsulant is disposed on and/or within the brake component the encapsulant is an integral part of the brake component. The method may include a step of obtaining a brake component. The method may include obtaining one of the carriers discussed herein. The method may include obtaining an adhesive, a paint, an ink, a stamp, a liquid paint, a dry paint, a bonding agent, a resin, a phenolic resin, or mixtures thereof. The method may include obtaining an encapsulant taught herein. The method may include obtaining any of the contents taught herein. The method may include obtaining an encapsulated lubricant and/or grease, a microencapsulated lubricant, a microencapsulated grease, or a combination thereof. The method may include a step of adding the lubricant into the encapsulant. The method may include a step of obtaining a combination of microencapsulated materials. For example, a microencapsulated grease, a microencapsulated anti-corrosion agent, and a microencapsulated graphite may be obtained and the combination of different microencapsulants may be mixed together and then applied to the brake component so that the brake component obtains the benefits of each encapsulants contents in the applied region. The method may include a step of mixing multiple different encapsulants together. For example, a plurality of different materials may be encapsulated in different encapsulants and then the different encapsulate may be mixed together and applied to the brake component. The method may include applying the carrier to the brake component. The method may include applying the encapsulant to the brake component. The method may include applying the carrier, the encapsulant, or both to the brake component. The method may include mixing the earner and the encapsulant together. The method may include a step of applying the mixture to the brake component. The method may include a step of applying the carrier and then applying the encapsulant or vice versa. The method may include painting the brake component and then applying the carrier, the encapsulant, or a mixture thereof. The method may include a step of applying the encapsulant to and/or within a brake component such as a secondary material. The method may include a step of disposing the encapsulant on and/or within a brake component such as a secondary material, a pressure plate, a shim, or a combination thereof. The method may include a step of embedding the encapsulant in a secondary material. The encapsulant may be mixed into one or more materials of a brake component, a secondary material, or both. For example, if a shim includes a rubber layer the encapsulant may be mixed info the rubber and then the rubber and encapsulant may be applied to the shim. The method may include a step of attaching a secondary material to a brake pad, a shim, a brake component, or a combination thereof so that the encapsulant becomes an integral part of the secondary material to a brake pad, a shim, a brake component, or a combination thereof.

The method may include a step of curing the carrier, the encapsulant, or a mixture thereof. The method may include a step of partially curing the carrier. The method may include a step of partially curing the carrier and then adding the encapsulant. The method may include a step of fully curing the carrier and then applying the encapsulant. The step of curing may be performed before, after, or during the application of the carrier, the encapsulant, or both. Pre-curing may be performed before, after, or during, application of the encapsulant, application of the carrier, or both. A final cure may be performed after the carrier, the encapsulant, or both are applied to the brake component. The method may include a step of fully curing only the carrier and immediately after removing the brake component from curing, adding the encapsulant to the carrier so that the hot carrier secures the encapsulant to the brake component. The method herein may result in a brake component such as a brake pad, brake shoe, support (backing) plate, brake shim, secondary material, pins, lands, shoulders, platforms, or a combination thereof as discussed herein that includes an encapsulant that is dry to the touch and during a brake apply the encapsulant is broken so that the encapsulant is released. The carrier, the encapsulant, or both may be applied and/or disposed on the brake component using any method and/or device so that the encapsulant is attached to the brake component, is dry to the touch, and releases its contents during a brake apply. The carrier, the encapsulant, the brake component, or a combination thereof may be heated so that during the step of applying the encapsulant to the pressure plate the encapsulant becomes pliable and the surface area contacting the pressure plate is increased.

The carrier, encapsulant, a flexible layer, an adhesive, a bonding agent, or a combination thereof may be layered on a base material and then stamped forming a brake component, bonding the components together on the base material, heat bonding and cutting the materials, or a combination thereof. One sheet of material may be formed with the various layers discussed herein and then the brake components, cut, stamped, pressed, or a combination thereof out of the sheet of material forming individual brake components. The encapsulant and another material taught herein may be combined together so that they form one unitary piece that may be used to bond two or more brake components together, reduce squeal, noise, vibration, or a combination thereof.

The carrier, the encapsulant, or a mixture thereof may be disposed on and/or within a secondary material and then the secondary material, the carrier, the encapsulant, or a mixture thereof may be disposed on and/or within the shim or the brake component. For example, a carrier, an encapsulant, or a mixture thereof may be applied to a secondary material (i.e., an adhesive, tape, film, stamp, or a combination thereof) and then the secondary material may be disposed on the brake component such as a shim or a pressure plate of a brake pad. The encapsulant may be disposed on and/or within one side and/or both sides of the secondary material. The secondary material may be tacky so that a carrier is not used other than the tackiness of the secondary material. The encapsulant may be embedded in the secondary material. The secondary material may partially surround and/or fully surround the encapsulant. The encapsulant may move through holes, pores, or both of the secondary material so that the contents of the encapsulant contact the surrounding brake components. The encapsulant may be placed in the secondary material during the making of the secondary material so that the encapsulant is part of the composition of the secondary material.

The secondary material may be made of any material that the encapsulant may be disposed on, embedded in, or both. The secondary material may be made of any material that when installed in a brake system exhibits noise insulating properties. The secondary material may be an adhesive, tape, film, stamp, paper, plastic, rubber, metal, stainless steel, rubber-coated metal, encapsulant coated metal, rubber including an encapsulant coated metal, or a combination thereof. The secondary material may be free of adhesive characteristics. The secondary material may have sufficient adhesive characteristics so that the encapsulant may be adhered to a brake component, but not sufficient to bond the secondary material to an adjoining brake component. The secondary material may be attached to the pressure plate of a brake pad, a shim, or both via an adhesive, a clip, a fastener, a rivet, a magnet, the contents of the encapsulant, or a combination thereof. The secondary material may be hard (i.e., the material has a low amount of compression during a brake apply). The secondary material may be soft (i.e., the material may compress during a brake apply).

The secondary material has a thickness. The thickness of the secondary material may be any thickness so that the secondary material fits within the packing space of the brake system without any modifications to the brake system. The secondary material may be used as an original part, and aftermarket part, or both. The secondary material may be about 2 mm or less, about 1 mm or less, about 0.8 mm or less, about 0.1 mm or less, or even about 0.001 mm or less in thickness. The secondary material may have a thickness of about 0.0001 or more or about 0.0005 mm or more. The secondary material may have a thickness of between about 0.0001 mm and about 3 mm, preferably between about 0.0003 mm and about 2 mm, and more preferably between about 0.001 mm and about 1.5 mm.

The carrier, the encapsulant, or a mixture thereof may be sufficiently small so that the encapsulant may be applied by an inkjet printer, a three-dimensional printer, spray painting, rolling, silk screen printing, or a combination thereof. The carrier, the encapsulant, or a mixture thereof may be applied and/or disposed by painting, inkjet printing, piezoelectric printer, screen printing, spraying, roller, brushing, dabbing, gluing, taping, pressing, stamping, or a combination thereof. The carrier, the encapsulant, or a combination thereof may use a template and/or a mask during the disposing/application process so that the carrier, the encapsulant, or a mixture thereof are disposed/applied to specific areas of the brake component. The carrier, the encapsulant, or a mixture thereof may be applied in an air environment, inert environment, an airless environment, or a combination thereof.

Figure 1:
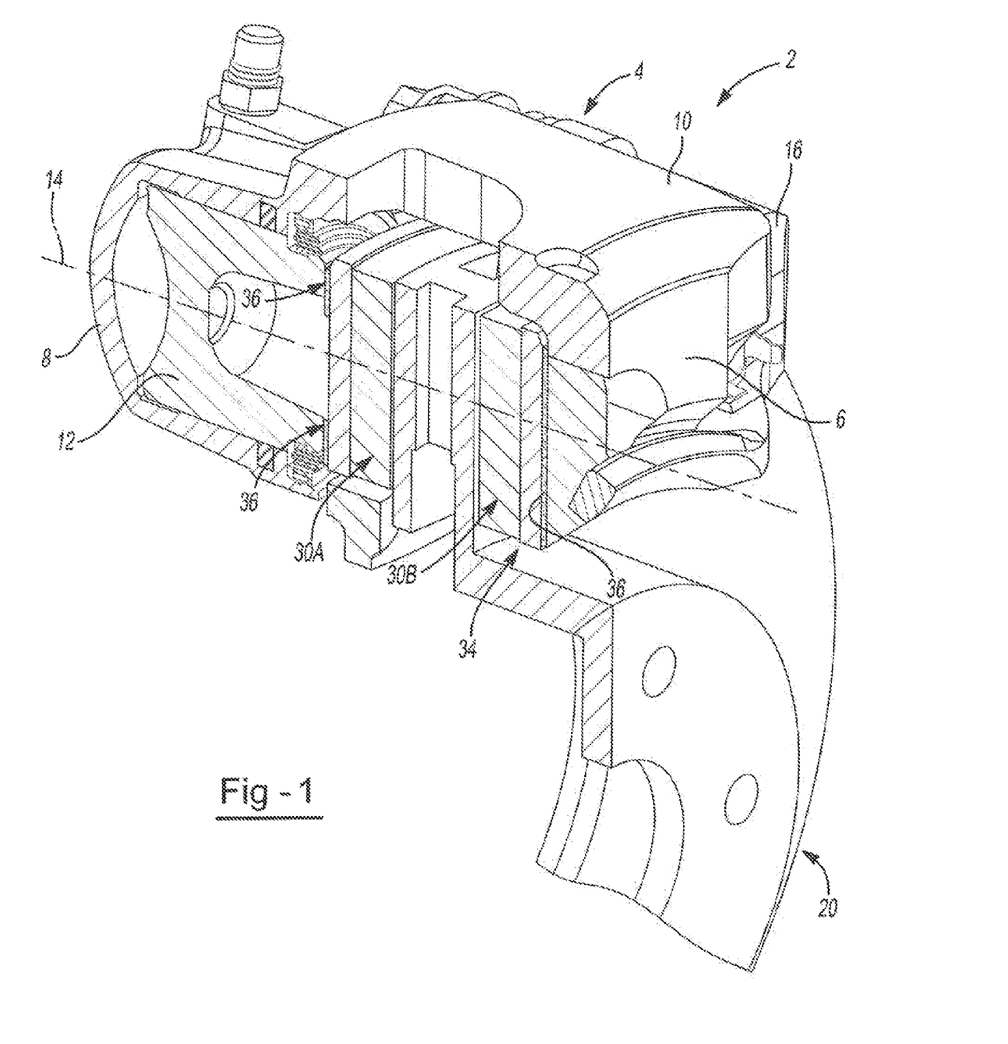
FIG. 1 illustrates an cross section of one possible brake system that may be used with the teachings herein.

FIG. 1 illustrates one possible brake system 2 configuration with which the present teachings may be used. The brake system includes a caliper 4, a rotor 20, and a support bracket 16. The caliper 4 includes one or more fingers 8, a piston bore 8, and a bridge 10 connecting the piston bore 8 and the one or more fingers 6. The piston bore 8 includes a piston 12 that travels along a piston bore axis 14. The piston 12 is moved into contact with the inboard brake pad 30A and then the piston 12 moves the inboard brake pad 30A into contact with the rotor 20. Once the inboard brake pad 30A contacts the rotor 20 the caliper 4 moves so that the one or more fingers 6 contact the outboard brake pad 30B and move the outboard brake pad 30B into contact with the rotor 20 to create a friction force. The piston 12 contacts the inboard brake pad 30A at a contact region 34 and the one or more fingers contacts the outboard brake pad 30B at another contact region 34. The contact regions 34 include an encapsulant 36 on the respective brake pad that breaks and is released upon an initial contact between the piston 8 and the inboard brake pad 30A and the one or more fingers 6 and the outboard brake pad 32 so that grease and/or lubricant lubricates the contact region 34 or so that an adhesive bonds the contact regions 34 together.

Figure 2:
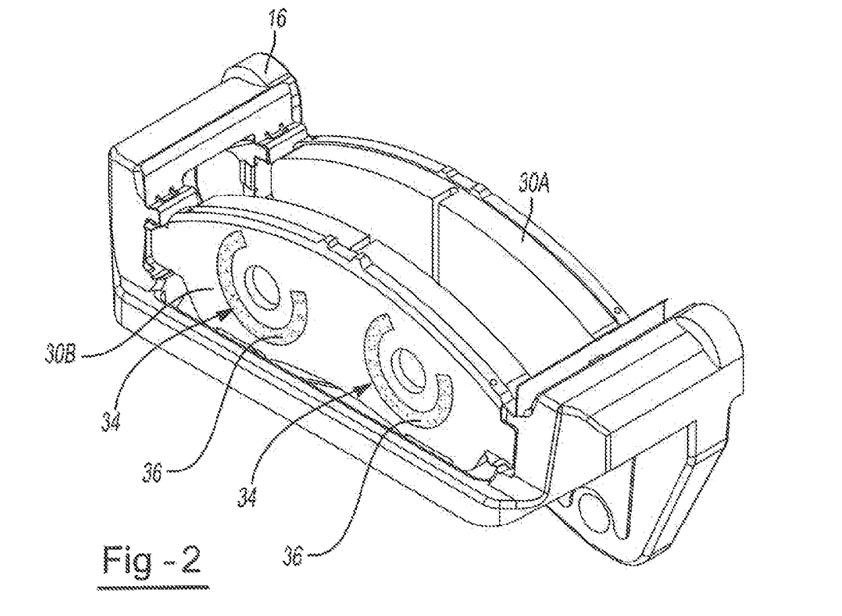
FIG. 2 illustrates an outboard view support bracket and brake pad with one possible application configuration of encapsulant on the brake pad that may be used with the teachings herein.

FIG. 2 illustrates one possible support bracket 16 including an inboard brake pad 30A and an outboard brake pad 30B. The outboard brake pad 30B includes an encapsulant 36 in the contact region 34 of the outboard brake pad 30B. An encapsulant 36 is shaped and sized so that the encapsulant 36 is located on the outboard brake pad 30B only where contact is made with the fingers of the caliper (not shown).

Figure 3:
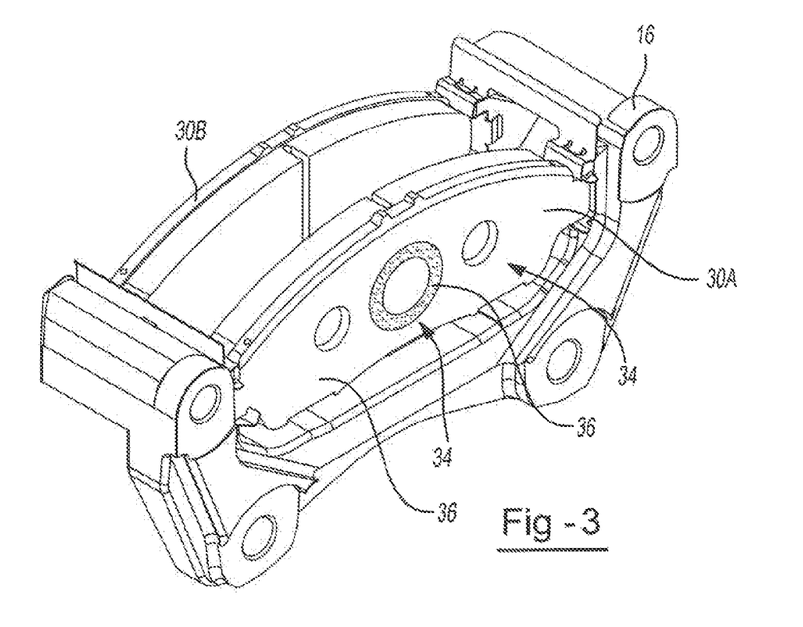
FIG. 3 illustrates an inboard view of a support bracket and brake pad with a another possible application configuration of encapsulant on the brake pad that may be used with the teachings herein.

FIG. 3 illustrates another possible support bracket 16 including an inboard brake pad 30A and an outboard brake pad 30B. The inboard brake pad 30A includes an encapsulant 36 in the contact region 34 of the inboard brake pad 30A. The encapsulant 36 is shaped and sized so that the lubricant and/or adhesive is placed on the inboard brake pad 30B only where contact is made with the piston (not shown). As illustrated, the brake system (not shown) is a single piston brake system, and includes only one contact region 34 with an encapsulant 36 on the inboard side.

Figure 4:
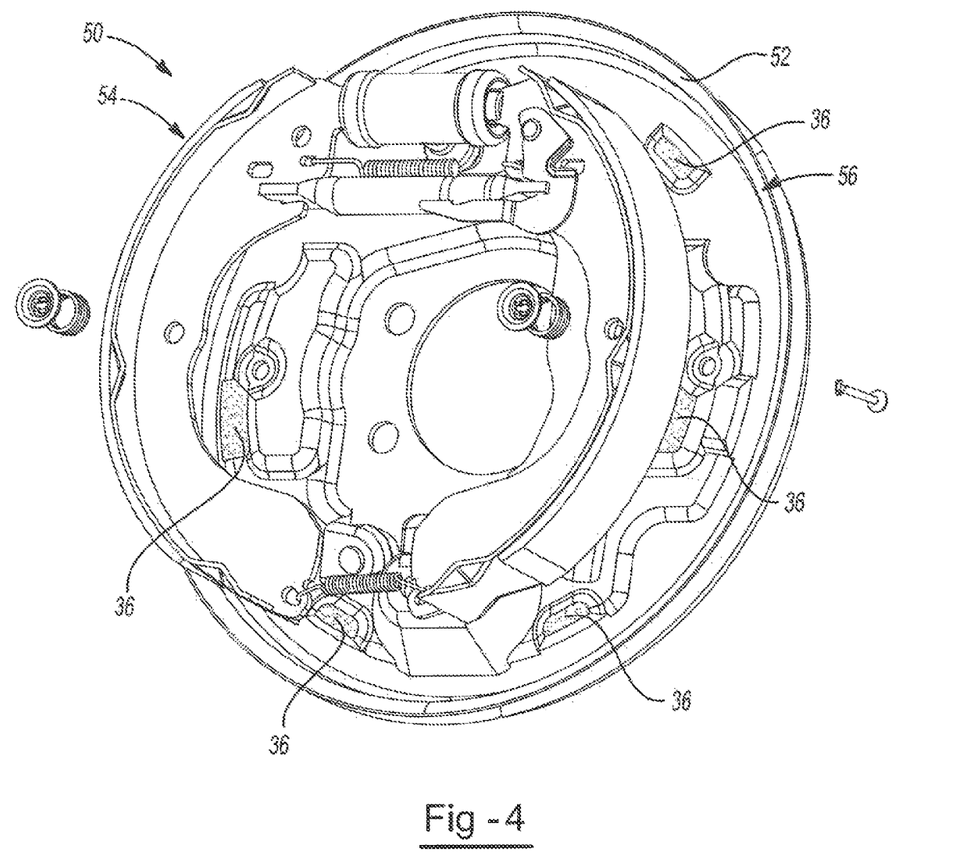
FIG. 4 illustrate possible drum brake assemblies including the encapsulant of the teachings herein.

FIG. 4 illustrates a possible drum brake system 50 including the encapsulant 36. As illustrated the encapsulant 36 is on the lands 56 of the support (backing) plate 52 so that the contents of the encapsulant 36 is dispelled when the brake shoes 54 are moved.

Figure 5:
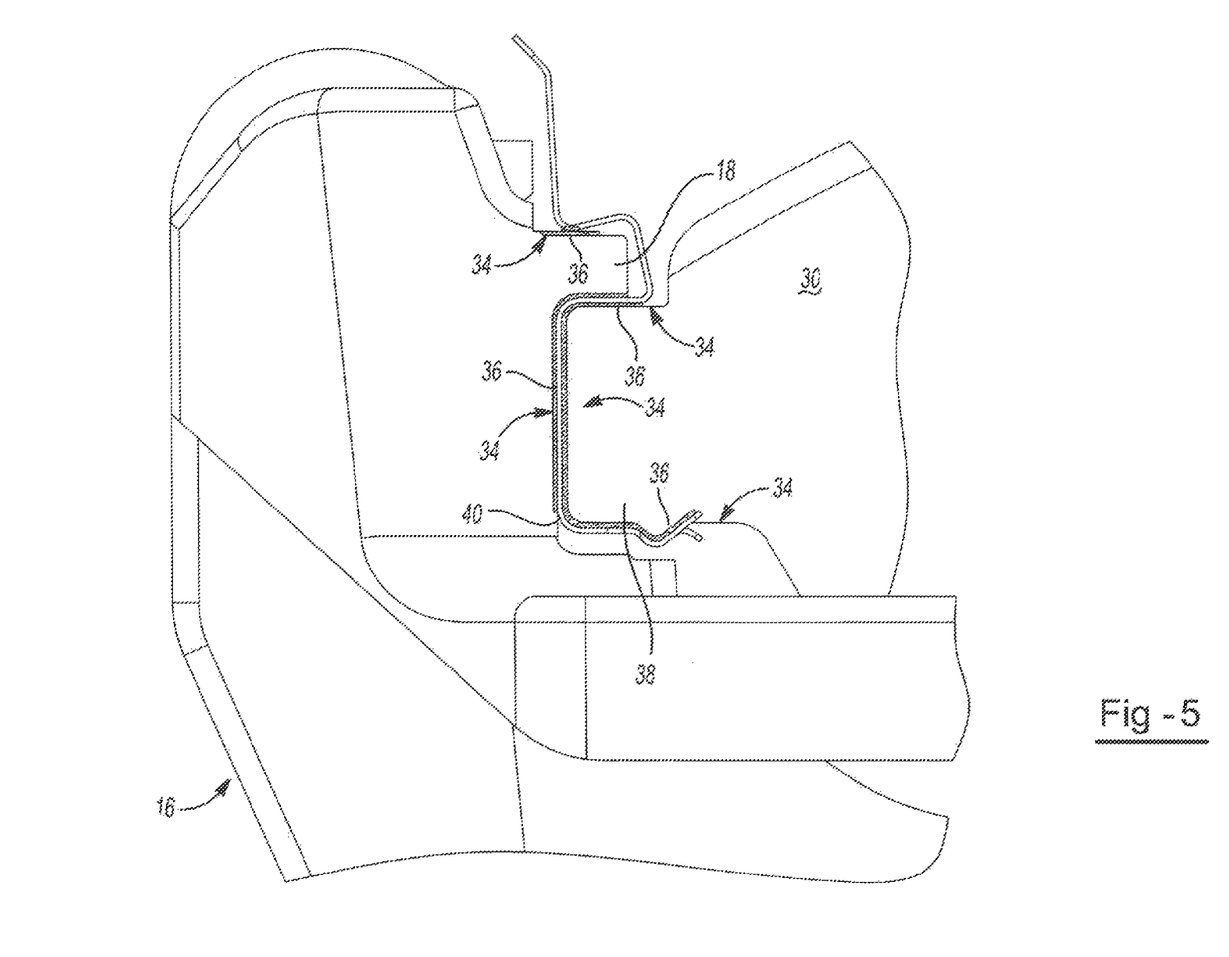
FIG. 5 illustrates a side view of one possible support bracket assembly including a pad clip and a pressure plate assembly with the encapsulant of the teachings herein disposed on the individual components.

FIG. 5 illustrates a side view of a support bracket 18 of FIG. 2 having an abutment 18. A pad clip 40 is located proximate to the support bracket 16 and is attached to the abutment 18 forming a contact region 34 therebetween. An ear 38 of a brake pad 30 is placed in the pad clip 40 forming contact regions 34 between the ear 33 and the pad clip 40. An encapsulant 36 is located in the contact regions 34.

Figure 6:
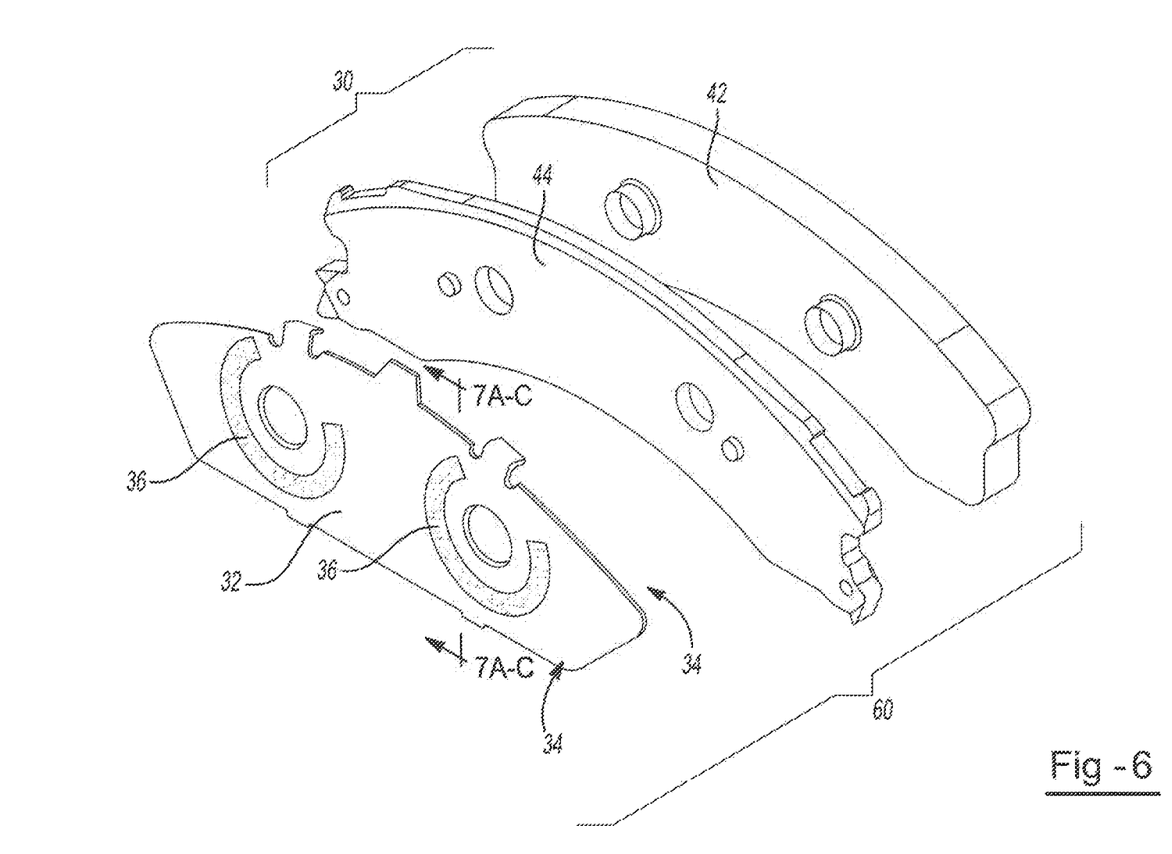
FIG. 6 illustrates an exploded brake pad and a shim including the encapsulant of the teachings herein disposed on both sides of the shim.

FIG. 6 illustrates an exploded view of a brake pad assembly 60. The brake pad assembly 60 includes a shim 32 and a brake pad 30 comprised of friction material 42 and a pressure plate 44. The shim 32 is located adjacent to the pressure plate 44 of the brake pad 30. The shim 32 includes a contact region 34 on both sides. The contact region 34 on both sides includes an encapsulant 36 so that during a pressure apply the encapsulant 36 is ruptured and lubricates the contact regions 34 and/or adheres the shim 32 and brake pad 30 together.

Figure 7A:
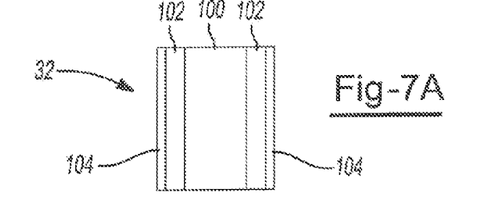
FIGS. 7A-7C illustrate cross sectional views of some possible configurations of a shim.
Figure 7B:
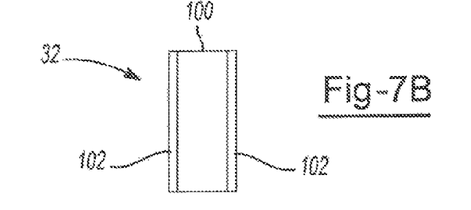
Figure 7C:
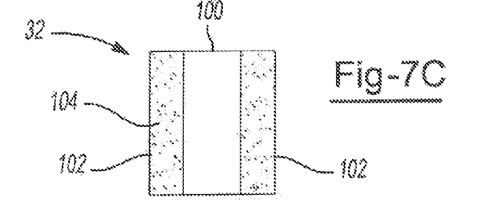

FIGS. 7A-7C illustrate examples of cross sections of the shim 32. The shim as illustrated in FIG. 7A includes a base material 100, a flexible cover material 102, and an encapsulant 104. FIG. 7B illustrates a base material 100 directly covered by an encapsulant 104. FIG. 7C illustrates a base material 100 with a flexible cover material 102 and an encapsulant 104 being located within the flexible cover material 102.

Figure 8A:
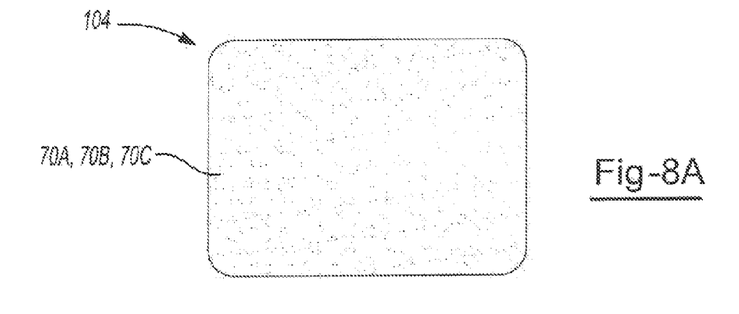
FIGS. 8A-8B illustrate cross-sectional views of some possible configurations of an encapsulant.
Figure 8B:
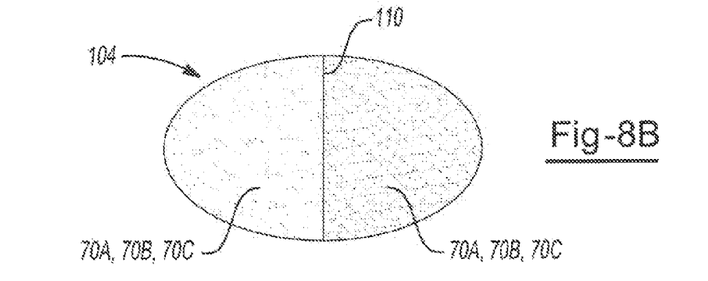

FIGS. 8A and 8B illustrate cross-sectional views of possible configurations of encapsulants 104 taught herein. FIG. 8A illustrates an encapsulant 104 containing a lubricant 70A, a grease 70B, an adhesive 70C, or a combination thereof as taught herein. The encapsulant 104 has a generally square shape with rounded corners. FIG. 8B illustrates an encapsulant 104 including a dividing wall 110 forming two separate pockets. Each pocket includes a different grease 70B, lubricant 70A, parts of a grease 70B, pads of a I lubricant 70A, an adhesive 70C, parts of an adhesive 70C, or a combination thereof so that when the dividing wall 110 and/or the outside-wall of the encapsulant 104 is ruptured the grease 70B, the lubricant 70A, the adhesive 70C, or a combination thereof combine together. The encapsulant 104 as illustrated is generally oval in shape.

Figure 9A:
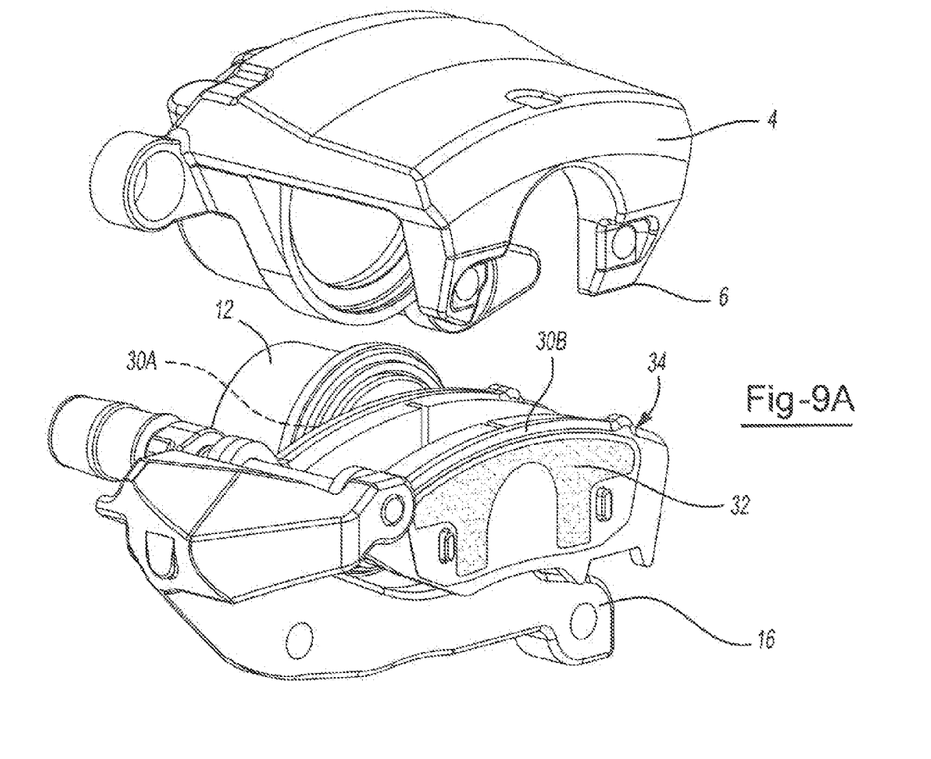
FIGS. 9A-9C illustrate two possible encapsulant patterns that may be used with the teachings herein and how the patterns correspond with the associated components of the brake system.
Figure 9B:
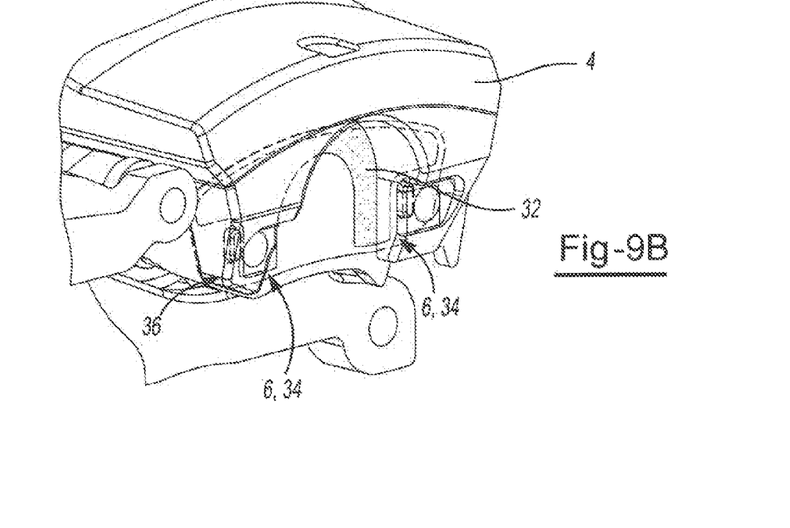
Figure 9C:
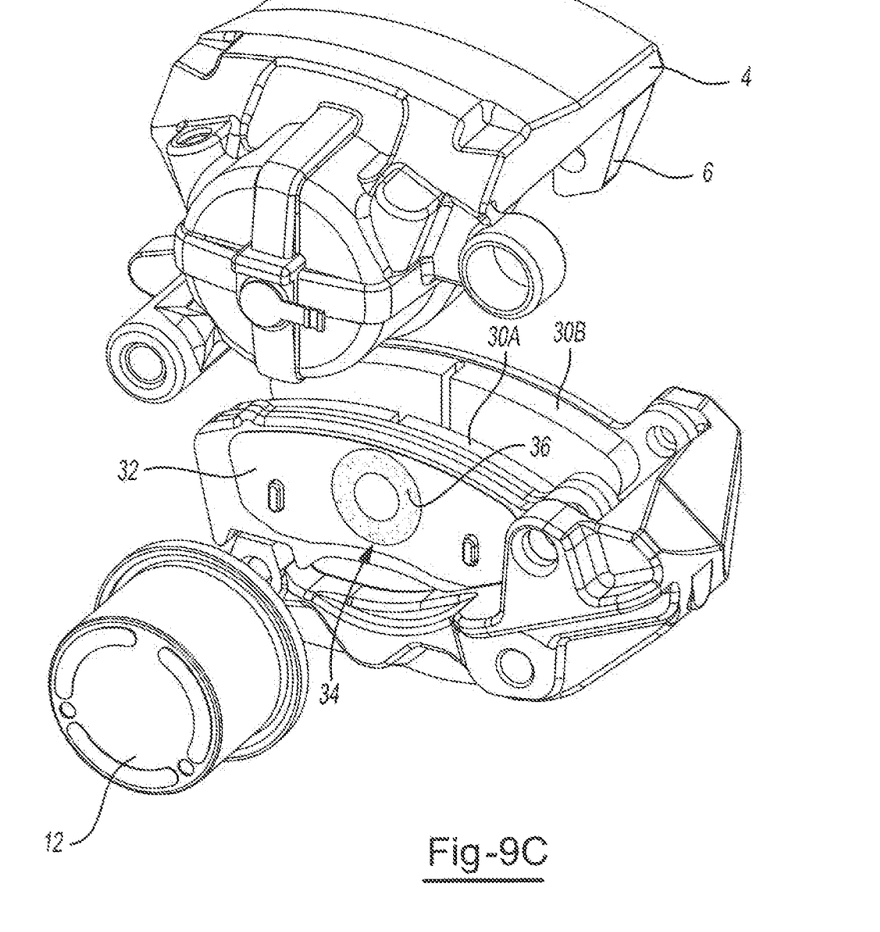

FIG. 9A-9C illustrate an exploded outboard view (FIG. 9A), an exploded inboard view (FIG. 9C), and an assembled a brake system 2 (FIG. 9B). FIG. 9A illustrates a caliper 4 having fingers 8 and a piston 12. The support bracket 16 includes an inboard brake pad 30A and an outboard brake pad 30B. The outboard brake pad 30B includes encapsulant 32 in the shape of the contact region 34 between the outboard brake pad 30B and fingers 6. The encapsulant 32 includes adhesive so that the fingers 6 and the outboard brake pad 30B are connected of a lubricant so that the contact region is lubricated.

FIG. 9B illustrates an outboard view with the caliper 4 in the installed position. The fingers 6 of the caliper 4 cover the contact areas 34 and the encapsulant 36.

FIG. 9C illustrates the caliper 4 exploded and extended over the support bracket 16, the inboard brake pad 30A and the outboard brake pad 30B. The shim 32 on the inboard brake pad 30A has encapsulant 36 in the contact region 34 in the shape of the piston 12 so that the shim 32 and the brake pad 30A are bonded to the piston 12 or the contact region 34 is lubricated.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate; These are only examples of what is specifically intended and all possible combinations of numerical values between the lowest value and the highest value enumerated are to be considered to be expressly stated in this application in a similar manner.

Unless otherwise stated, all ranges include both end points and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The omission in the following claims of any aspect of subject matter that is disclosed herein is not a disclaimer of such subject matter, nor should if be regarded that the inventors did not consider such subject matter to be part of the disclosed inventive subject matter.

We claim:

1. A brake shim composition comprising:
   1. a base layer;
   2. optionally one or more flexible layers; and
   3. one or more encapsulant layers including:
      i. an encapsulant containing one or more lubricants and/or one or more adhesives, and
      ii. a carrier including an adhesive attaching the encapsulant to the base layer;
   wherein, the encapsulant and the carrier are free of tackiness after the encapsulant is attached to the base layer and prior to an initial brake apply.

2. The shim of claim 1, wherein the encapsulant includes the one or more lubricants;
   the carrier is a thermoset; and
   the carrier includes a component that reacts with the one or more lubricants and becomes non-tacky at operational temperatures.

3. The shim of claim 1, wherein the shim has two sides and the encapsulant is connected to both sides of the shim.

4. The shim of claim 1, wherein the encapsulant has a size that is sufficiently small so that the encapsulant can be applied by an inkjet printer, a three-dimensional printer, spray painting, rolling, silk screen printing, electrostatic spray painting, or a combination thereof.

5. The shim of claim 1, wherein the encapsulant has a size that is sufficiently large so that a volume of the encapsulant holds, enough lubricant so that the lubricant assists in reducing and/or eliminating noise, vibration, and harshness in a braking system, enough adhesive so that the adhesive assists in fixedly connecting the shim to a brake component so that the adhesive assists in reducing and/or eliminating noise, vibration, and harshness in the braking system, or a combination of both.

6. The shim of claim 1, wherein the encapsulant includes an adhesive, and the adhesive forms a fixed connection at running temperatures, forms a fixed connection at a use temperature, or both.

7. The shim of claim 1, wherein the encapsulant includes an adhesive, and the adhesive forms a fixed connection at running temperatures and bonds of the adhesive release during braking so that the adhesive forms a lubricating layer.

8. The shim of claim 1, wherein the encapsulant includes one component of a multi-part adhesive and the carrier is a second part of the multi-part adhesive.

9. The shim of claim 3, wherein both sides of the shim include an adhesive, both sides include a lubricant, or one side includes an adhesive and one side includes a lubricant.

10. The shim of claim 1, wherein the adhesive is a multi-component adhesive and two or more different encapsulants are used that each include a different part of the multi-component adhesive so that when contents of the two or more different encapsulants are dispelled the contents mix and create a secured connection between the shim and a brake component.

11. The shim of claim 1, wherein the shim includes encapsulant only in regions on the shim that contact another component of a brake system during a brake apply.

12. The shim of claim 1, wherein the shim includes two sides and the shim includes a flexible layer on each side, and
    wherein the encapsulant is at least partially embedded within the flexible layer so that during the initial brake apply contents of the encapsulant are released.

13. A brake device comprising:
    a brake component including:
       i. an encapsulant containing one or more lubricants and/or one or more adhesives, or both, and
       ii. a carrier assisting in adhering the encapsulant to the brake component
    wherein the carrier and the encapsulant are disposed on and/or within one or more brake components, and
    wherein the encapsulant, the carrier, or both are dry to the touch and free of tackiness after the encapsulant is attached to the brake component and prior to an initial brake apply.

14. The device of claim 13, wherein the encapsulant is disposed on and/or within the brake component so that the encapsulant is only located on and/or within contact regions of the brake component where the brake component comes into contact with another brake component.

15. The device of claim 13, wherein the brake component is a brake pad, a shim, brake pad abutment, a support bracket abutment, pins, a brake shoe, a support plate, a piston, one or more fingers of a caliper, or a combination thereof, and
    wherein the brake component is free of excess one or more lubricants, on or more adhesives, or both on the brake component.

16. The device of claim 14, wherein the encapsulant breaks during an initial brake apply or initial use so that the one or more lubricants one or more adhesives, or both covers the contact regions of the brake component and the another brake component.

17. The shim of claim 1, wherein the encapsulant breaks after the initial brake apply so that the one or more lubricants and/or the one or more adhesives are released from within the encapsulant.

18. The shim of claim 17, wherein the encapsulant is resistant to breaking due to heat prior to the initial brake apply, wherein the encapsulant withstands breaking at about 500 degrees Celsius or less.

19. The shim of claim 13, wherein the encapsulant includes magnetic particles,
wherein the magnetic particles assist in maintaining the encapsulant in place on the brake component.

20. The device of claim 13, wherein the encapsulant is disposed within the brake component, and
wherein the one or more lubricants, one or more adhesives, or both exit the brake component through pores or holes in the brake component.

* * * * *